United States Patent [19]

Schick

[11] Patent Number: 5,531,012

[45] Date of Patent: Jul. 2, 1996

[54] SYSTEM AND METHOD FOR RIVETING CLIPS TO CONVEYOR-BELT ENDS

[75] Inventor: Jean-François Schick, Saint Privat des Vieux, France

[73] Assignee: Goro S.A., Saint Privat Des Vieux, France

[21] Appl. No.: 354,932

[22] Filed: Dec. 12, 1994

[30] Foreign Application Priority Data

Dec. 18, 1993 [DE] Germany ........................ 43 43 384.7

[51] Int. Cl.⁶ .................. B23P 11/00; B25C 9/00
[52] U.S. Cl. .................. 29/432.1; 29/243.51; 29/798; 29/525.07; 24/31 B; 227/147
[58] Field of Search .................. 29/243.81, 11, 29/432.1, 509, 525.2, 798, 432, 525.1, 33.5; 227/147, 155; 24/33 B, 33 P, 31 B; 411/495, 498

[56] References Cited

U.S. PATENT DOCUMENTS

| | | | |
|---|---|---|---|
| 3,108,368 | 10/1963 | Steward | 29/798 X |
| 3,176,358 | 4/1965 | Leflon | 29/33 B |
| 3,458,099 | 7/1969 | Schick | 227/155 |
| 3,913,180 | 10/1975 | Pray | 24/33 B |
| 4,212,094 | 7/1985 | Pray | 24/33 P X |
| 4,517,737 | 5/1985 | Sulzle | 29/798 |
| 4,538,755 | 9/1985 | Schick | 29/243.51 |
| 4,688,711 | 8/1987 | Gladding et al. | 29/243.51 X |

FOREIGN PATENT DOCUMENTS 2202605  9/1988  United Kingdom ............... 29/243.51

Primary Examiner—Peter Vo
Assistant Examiner—Khan V. Nguyen
Attorney, Agent, or Firm—Herbert Dubno; Andrew Wilford

[57] ABSTRACT

A clip-mounting machine secure a clip by at least one rivet to a belt end. The clip has front and back legs each formed with a throughgoing hole and adapted to embrace the belt end with each leg engaging the respective belt face and a U-shaped bight interconnecting the legs. The rivet has one end formed as a head with an outwardly directed end face and an opposite free end formed with an oppositely directed end face centrally formed with a generally conical recess. The machine has a front jaw formed with at least one guide passage adapted to hold the rivet, a holder on the front jaw for retaining the front leg of the clip thereon with the respective hole aligned with the passage, and a back jaw displaceable between a closed position relatively close to and engaging the back leg of the clip whose front leg is in the holder to compress the belt end between the legs and an open position spaced from and not engaging the clip in the holder. A centering point is provided on the back jaw aligned with the holes of the legs in the closed position. A punch displaceable in the guide passage drives the rivet along the passage, through the hole in the front leg, through the belt, and through the hole in the back leg until the recess fits over the centering point and the free rivet end on the point is upset to form another head.

9 Claims, 5 Drawing Sheets

SYSTEM AND METHOD FOR RIVETING CLIPS TO CONVEYOR-BELT ENDS

FIELD OF THE INVENTION

The present invention relates to a system for fastening end clips to conveyor belts. More particularly this invention concerns a system for riveting such clips to the belt ends.

BACKGROUND OF THE INVENTION

It is frequently necessary to make up or repair drive or conveyor belts. This procedure typically consists of joining two ends of a section of belting to form an endless belt. Such procedures are described in my copending application Ser. No. 07/989,807, is now U.S. Pat. No. 5,368,214 as well as in U.S. Pat. Nos. 4,538,755, 5,095,590, and 5,182,933.

As a rule a plurality of U-shaped clips, which may all be connected together, are stapled to each belt end so that they can be interleaved and a connecting pin can be slid through them. This forms the clips into a sort of hinge that solidly connects together the belt ends while still permitting it to flex. Each such clip or connector typically is made of metal and has a pair of legs adapted to embrace the respective belt end and a bight portion interconnecting the outer ends of the legs. Each leg in turn is formed with at least two through-going holes that align with the holes of the leg on the opposite face of the belt, and staples are driven through the registering holes from one side of the belt and are crimped over on the other side.

For certain purposes (see U.S. Pat. No. 3,176,358), for instance agricultural systems were foodstuffs or bails are being moved by the belts, the staples must be replaced with rivets which are less likely to catch on the item being conveyed. It is therefore necessary to adapt the installing system to push rivets through the one leg of the clip, the belt, and the other leg of the clip. Thus the rivet head lies on the one leg and the free end of the rivet passes beyond the other leg so it can be headed over. This requires that the rivet be fitted perfectly through the aligned holes of the two clip legs and the belt between them. Obviously such alignment is a problem, yet it must be perfect for the belt to be usable.

OBJECTS OF THE INVENTION

It is therefore an object of the present invention to provide an improved system for securing clips to a conveyor-belt end.

Another object is the provision of such an improved system for securing clips to a conveyor-belt end which overcomes the above-given disadvantages, that is which allows such clips to be riveted to the belt ends while insuring that the rivets are perfectly positioned.

Another object is to provide an improved method of mounting clips on belt ends.

SUMMARY OF THE INVENTION

The system of this invention includes, in combination, a belt end having opposite front and back faces, a clip, a rivet, and a clip-mounting machine. The clip according to the invention has front and back legs each formed with at least one through-going hole and adapted to embrace the belt end with each leg engaging the respective belt face, and a U-shaped bight interconnecting the legs. The rivet has one end formed as a head with an outwardly directed end face and an opposite free end formed with an oppositely directed end face centrally formed with a generally conical recess. The machine has according to the invention a front jaw formed with at least one guide passage adapted to hold the rivet, a holder on the front jaw for retaining the front leg of the clip thereon with the respective hole aligned with the passage, and a back jaw displaceable between a closed position relatively close to and engaging the back leg of the clip whose front leg is in the holder to compress the belt end between the legs and an open position spaced from and not engaging the clip in the holder. A centering point is provided on the back jaw aligned with the holes of the legs in the closed position. A punch displaceable in the guide passage drives the rivet along the passage, through the hole in the front leg, through the belt, and through the hole in the back leg until the recess fits over the centering point and the free rivet end on the point is upset to form another head.

Thus the instant invention can rivet the clip on with a machine that is essentially the same as the standard clip-stapling apparatus described in the above-cited references. Surprisingly, it has been found that with such a machine the rivets are pushed perfectly straight through the belt so they always exit through the back-leg hole where they can be upset or headed over. At the same time the rivet can punch its own hole, easily cutting through the belt material. A particular advantage of a rivet is that if it is made a little long it can easily compensate for variations of 1.5 mm to 2 mm in belt thickness. The rivet itself can be made of copper, light metal, or steel.

In accordance with this invention each of the holes has an outer edge shaped to conform to the respective rivet head. Thus the rivet will be flush on each outer clip face, so that nothing can catch on it. In addition the back-leg hole has an inwardly flared frustoconical edge turned toward the front-leg hole and serving to guide in the rivet as it is driven through the belt end. More particularly each of the leg holes has an outwardly flared frustoconical edge turned away from the other leg, the heads being of frustoconical shape.

According to another feature of the invention a latch is provided for securing the jaws together in the closed position. Furthermore the front jaw is formed with a plurality of such passages and the punch has a plurality of punch rods each engageable in a respective one of the passages. The rivets can be driven through one at a time, two at a time, or all together.

The clip-securing method according to the invention therefore comprises the steps of first fitting the front leg of the clip to a front jaw of a fastening machine, fitting the belt end between the legs of the clip, and providing in a guide passage in the front jaw the rivet. Then the jaws are closed together to clamp the belt between the legs of the clip with the leg holes aligned with the passage, and thereafter the rivet is driven from the passage first through the front-leg hole, then through the belt end, then through the back-leg hole, and finally against a centering point that engages in the conical recess to upset the free end of the rivet at the back leg. As the rivet is driven through the belt end it forms for itself a hole through the belt end.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
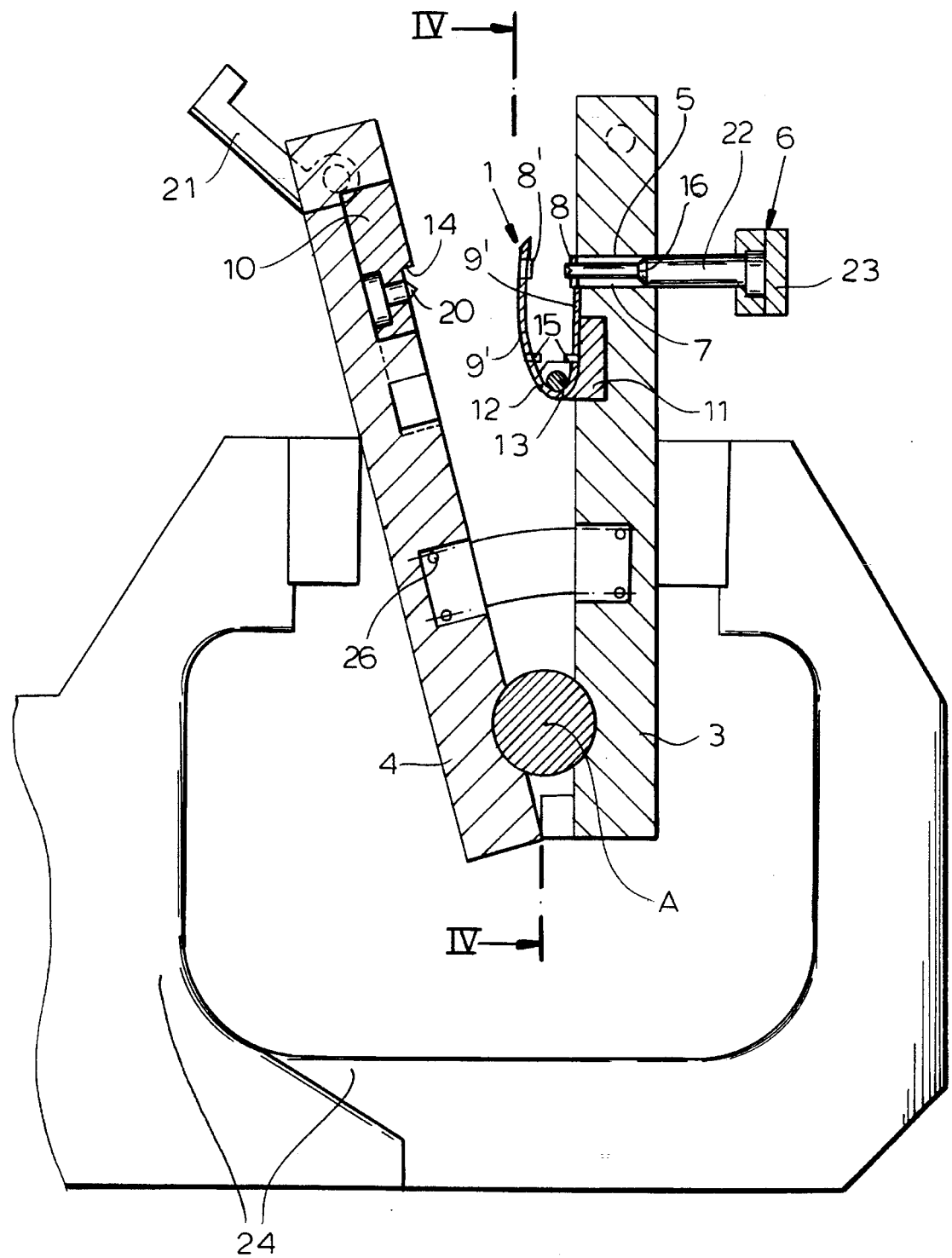
FIG. 1 is a side view partly in vertical section through a clip-installing machine according to the invention, with clips loaded in place.
Figure 2:
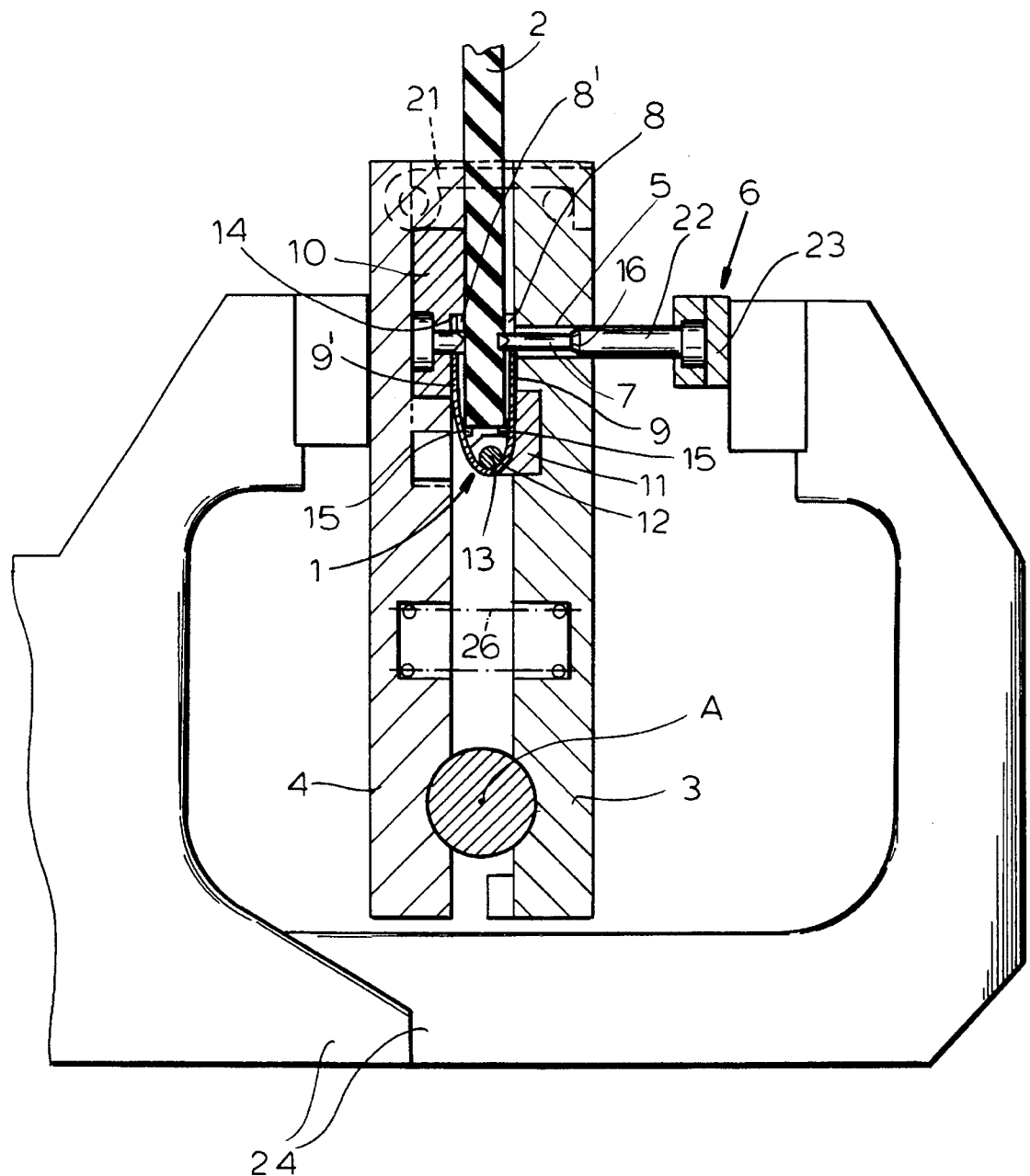
FIG. 2 is a view like FIG. 1 but with the belt clamped in place ready to be fastened to the clips.
Figure 3:
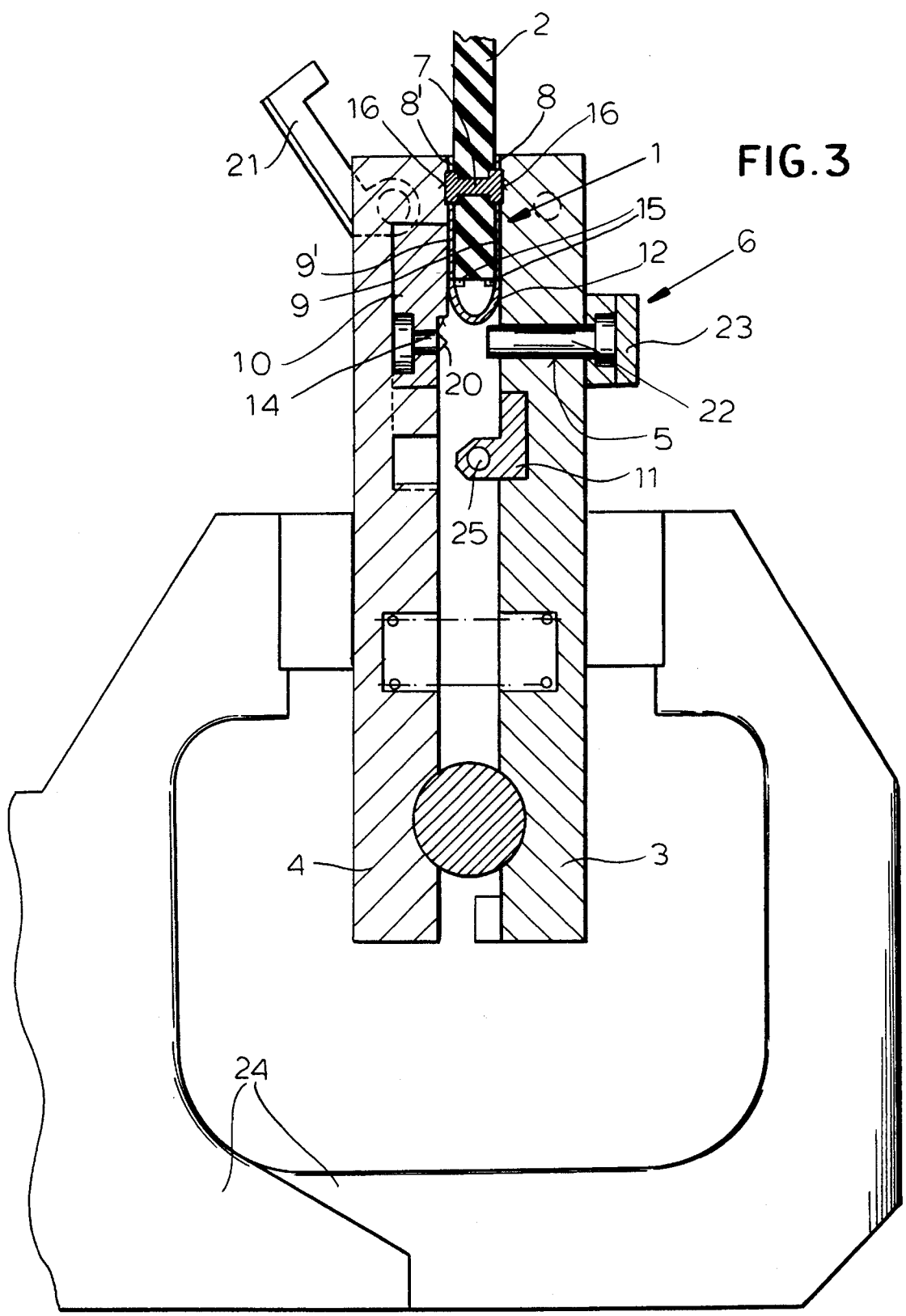
FIG. 3 is another view like FIG. 1 but as the finished belt end is being withdrawn from the machine.

As seen in FIGS. 1 through 3 an apparatus for installing end clips 1 on a belt end 2 comprises a front jaw 3 and a back jaw 4 pivotal about an axis A relative to each other on an actuating frame 24. The front jaw 3 is formed with a row of cylindrical and throughgoing guide holes 5 into which can fit a multiple punch 6 to force rivets 7 through holes 8 and 8' in legs 9 and 9' of the clips 1. The back jaw 4 is fitted with an anvil block 10 against which the back legs 9' bear.

Figure 4:
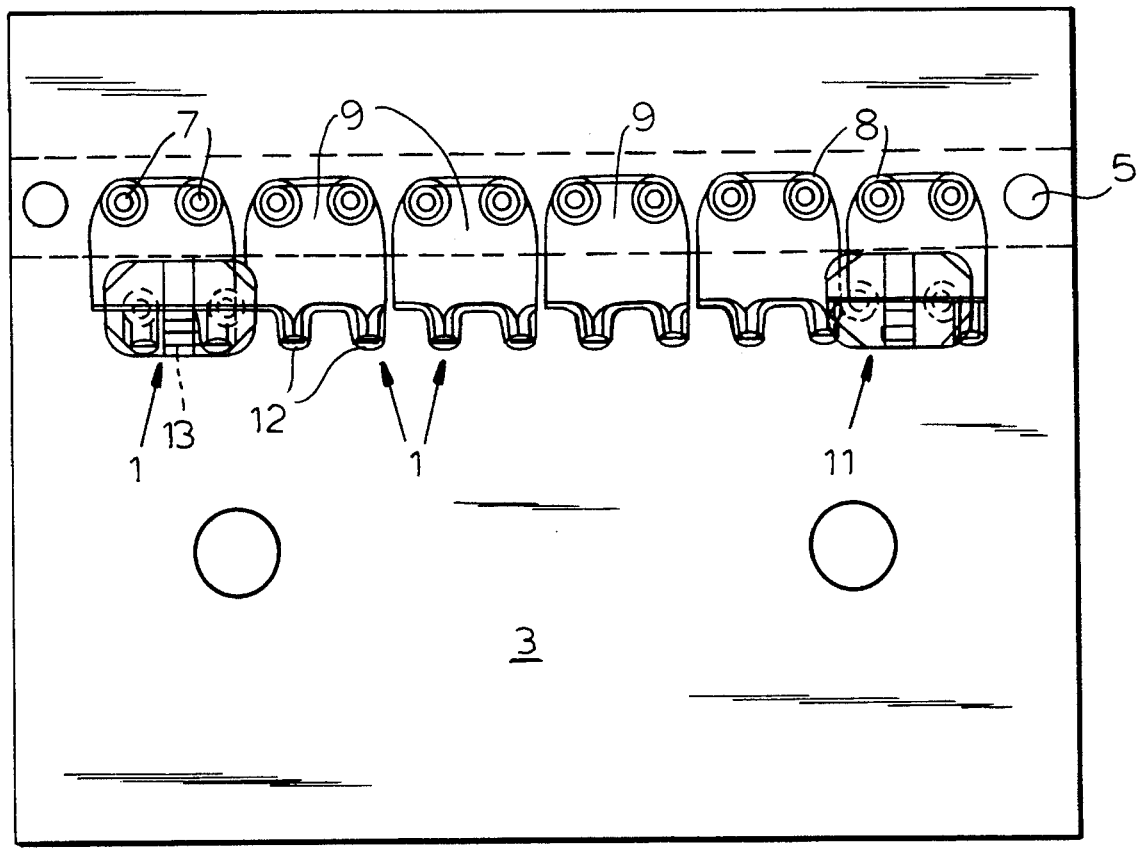
FIG. 4 is a view taken generally along plane IV—IV of FIG. 1.
Figure 7:
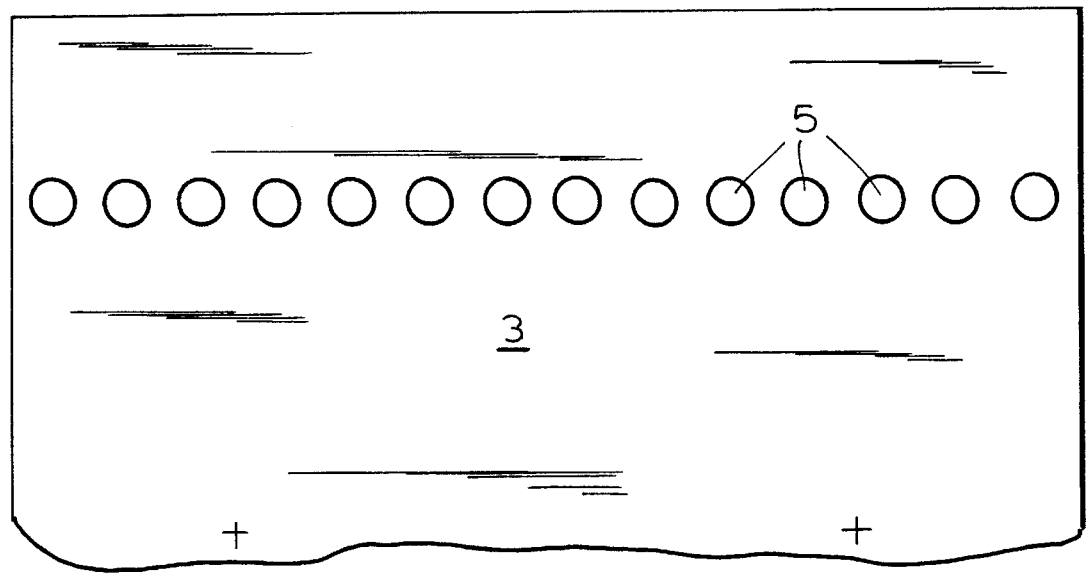
FIG. 7 is a front view of the front jaw of the apparatus.

Each clip 1 has a U-shaped bight 12 joining the respective legs 9 and 9' (which are each in fact formed with two such holes 8 and 8' as shown in FIG. 4) and fitting with a holder 11 of the front jaw 3 for installation. In addition a removable retaining pin 13 like the eventual hinge pin that will be used is slipped through eyes 25 of the holders 11 and the bights 12 to retain the clips 1 in place. The anvil 10 is provided with a shoulder 14 acting as a guide formation to ensure that the back legs 9' are perfectly positioned on this anvil 10, and both legs 9 and 9' are formed with inwardly bent tabs 15 against which the edge of the belt end 2 is abutted, again ensuring perfect relative positioning.

Figure 5:
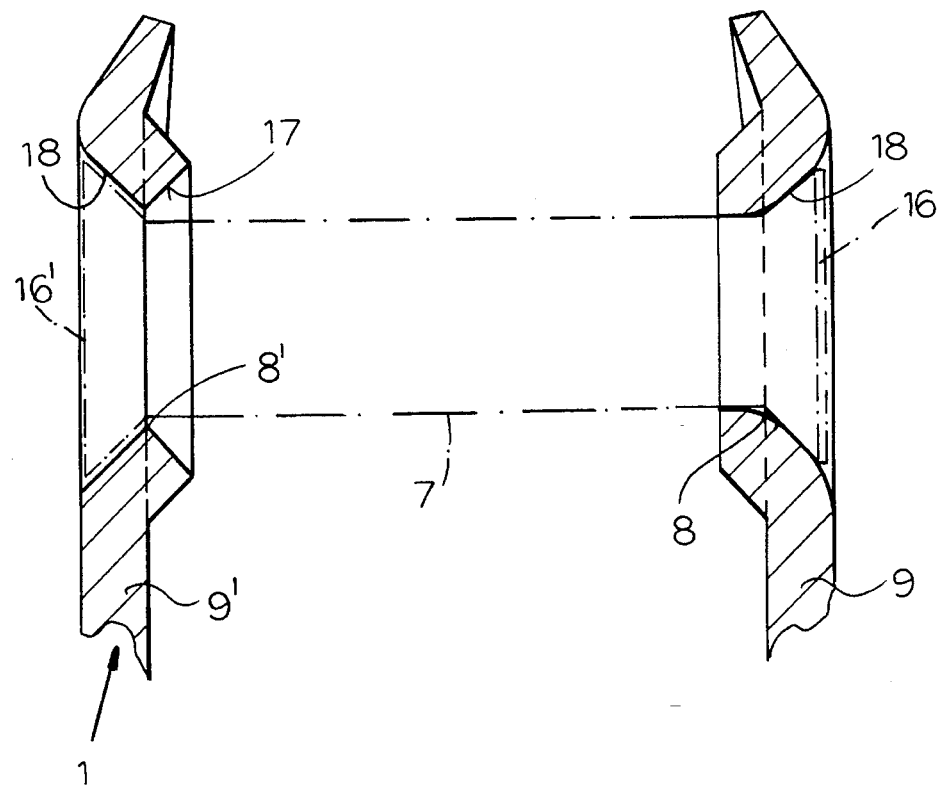
FIG. 5 is a large-scale axial section through a riveted clip according to the invention.
Figure 6:
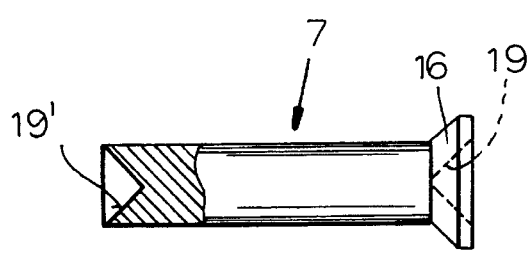
FIG. 6 is a large-scale and partly sectional view of a rivet according to the invention.

As seen in FIG. 6, one end of each rivet 7 has a head 16 formed centered on an axis of the rivet 7 with a conical recess or dimple 19, and the opposite end of the rivet shaft has an identical such conical dimple 19'. The anvil 10 is provided with centering points 20 that engage in the dimples 19'. In addition a latch 21 can secure the two jaws 3 and 4 to each other once they are moved from the open position of FIG. 1 to the closed position of FIG. 2. Springs 26 normally urge the jaws 3 and 4 apart. In addition as shown in FIG. 5 the front or inside face of the leg 9' is formed with a frustoconical bevel or chamfer 17 around each hole 8' to aid in fitting of the free rivet end through it, and the outer faces of both legs 9 and 9' are formed around the holes 8 and 8' with similar frustoconical chamfers 18. The rivet head 16 is complementary shaped and, once upset, so is the free end 161 of the rivet 7.

Figure 8:
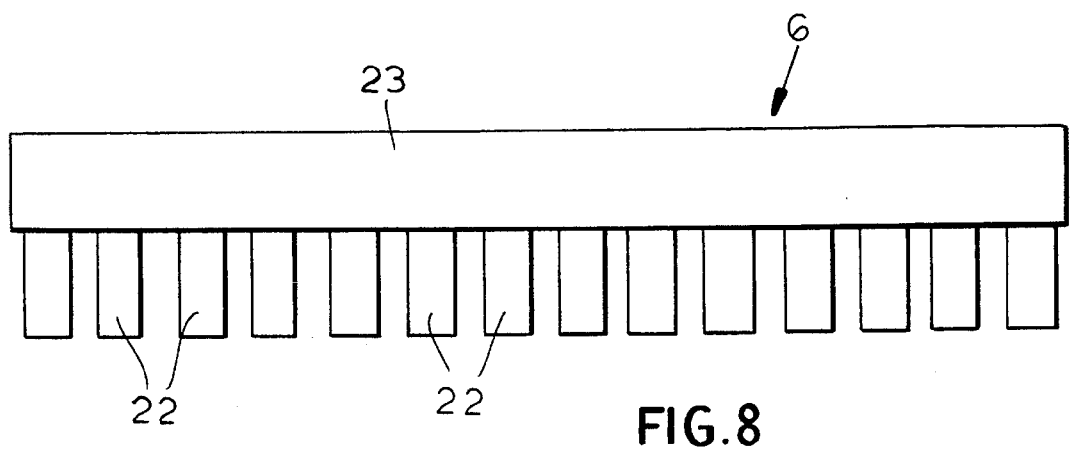
FIG. 8 is a top view of the multiple punch/alignment tool of the invention.

The punch 6 has as seen in FIG. 8 a plurality of cylindrical pins 22 that fit snugly in the holes 5 and a traverse or back bar 23 interconnecting them.

Clips 1 are fastened to a belt end 2 as follows:

To start with in the FIG. 1 open position of the jaws 3 and 4 the legs 9 and bights 12 of the clips 1 are fitted to the holders 12 and the retaining pin 13 is slipped through the eyes 25 to hold them exactly in place on the jaw 3.

Then the belt end 2 is slipped down between the legs 9 and 9' until it abuts the stop tabs 15, and the jaws 3 and 4 are closed by the frame 24 and secured (closed) by the latch 21 as shown in FIG. 2. Rivets 7 are fitted into the holes 5 with their free ends in the holes 8 of the legs 9.

The punch 6 is then hammered in to force the rivets 7 through the belt end 2, each making its own hole. As the free end of each rivet 7 emerges from the back side of the belt 2 it passes through the respective hole 8' of the back leg 9' and seats on the respective centering point 20. As the punch rods 22 continue to push down on the head 16, the free rivet ends are spread to form a second head as indicate at 16' in FIG. 5. The result is an extremely solid and neat connection.

I claim:

1. A fastening machine used in combination with, a belt end having opposite front and back faces;

a clip comprising:
  front and back legs each formed with at least one throughgoing hole and shaped and dimensioned to embrace the belt end with each leg engaging the respective belt face, and
  a U-shaped bight interconnecting the legs; and a rivet having one end formed as a head with an outwardly directed end face and an opposite free end formed with an oppositely directed end face centrally formed with a generally conical recess such that the free end can cut through the belt end;

the fastening machine comprising:
  a front jaw formed with at least one guide passage shaped and dimensioned to hold the rivet;
  a holder on the front jaw for retaining the front leg of the clip thereon with the respective hole aligned with the passage;
  a back jaw pivotally displaceable between a closed position relatively close to and engaging the back leg of the clip whose front leg is in the holder to compress the belt end between the legs, and an open position spaced from and not engaging the clip in the holder;
  a centering point on the back jaw aligned with the holes of the legs in the closed position; and
  means including a punch displaceable in the guide passage for forcing the rivet along the passage, through the hole in the front leg, through the belt, and through the hole in the back leg until the recess fits over the centering point and for upsetting the free rivet end on the centering point to form another head on the free rivet end, whereby the free end of the rivet is employed for cutting a hole through the belt end.

2. The combination defined in claim 1 wherein each of the holes has an outer edge shaped to conform to the respective rivet head.

3. The combination defined in claim 1 wherein the back-leg hole has an inwardly flared frustoconical edge turned toward the front-leg hole.

4. The combination defined in claim 1 wherein each of the leg holes has an outwardly flared frustoconical edge turned away from the other leg.

5. The combination defined in claim 1 wherein the heads are of frustoconical shape.

6. The combination defined in claim 1, further comprising means for latching the jaws together in the closed position.

7. The combination defined in claim 1 wherein the front jaw is formed with a plurality of such passages, the punch means having a plurality of punch rods each engageable in a respective one of the passages.

8. The combination defined in claim 1 wherein the conical recess forms on the end face a sharp edge, whereby the rivet can be driven through the belt end with the sharp edge cutting a hole through the belt end.

9. A method of securing a clip to a belt end having opposite front and back faces with a fastening machine having a front jaw formed with a guide passage and a back jaw spacedly confronting the front jaw and carrying a centering point, the clip having front and back legs each formed with at least one throughgoing hole and shaped and dimensioned to embrace the belt end with each leg engaging the respective belt face, and a U-shaped bight interconnecting the legs; the method comprising the steps of:

fitting the front leg of the clip to the front jaw;

fitting the belt end between the legs of the clip;

providing in the guide passage in the front jaw a rivet having one end formed as a head and an opposite free end formed centrally with a generally conical recess;

thereafter closing the front and back jaws pivotally together to clamp the belt between the legs of the clip with the leg holes aligned with the passage; and thereafter driving the rivet from the passage first through the front-leg hole, then through the belt end by cutting a hole through the belt end with the free end of the rivet, then through the back-leg hole, and finally against the centering point to engage the centering point in the conical recess and to upset the free end at the back leg with the centering point.

* * * * *